W. G. DINGLE.
METHOD OF FUMIGATING.
APPLICATION FILED MAY 5, 1917.
1,304,747.
Patented May 27, 1919.
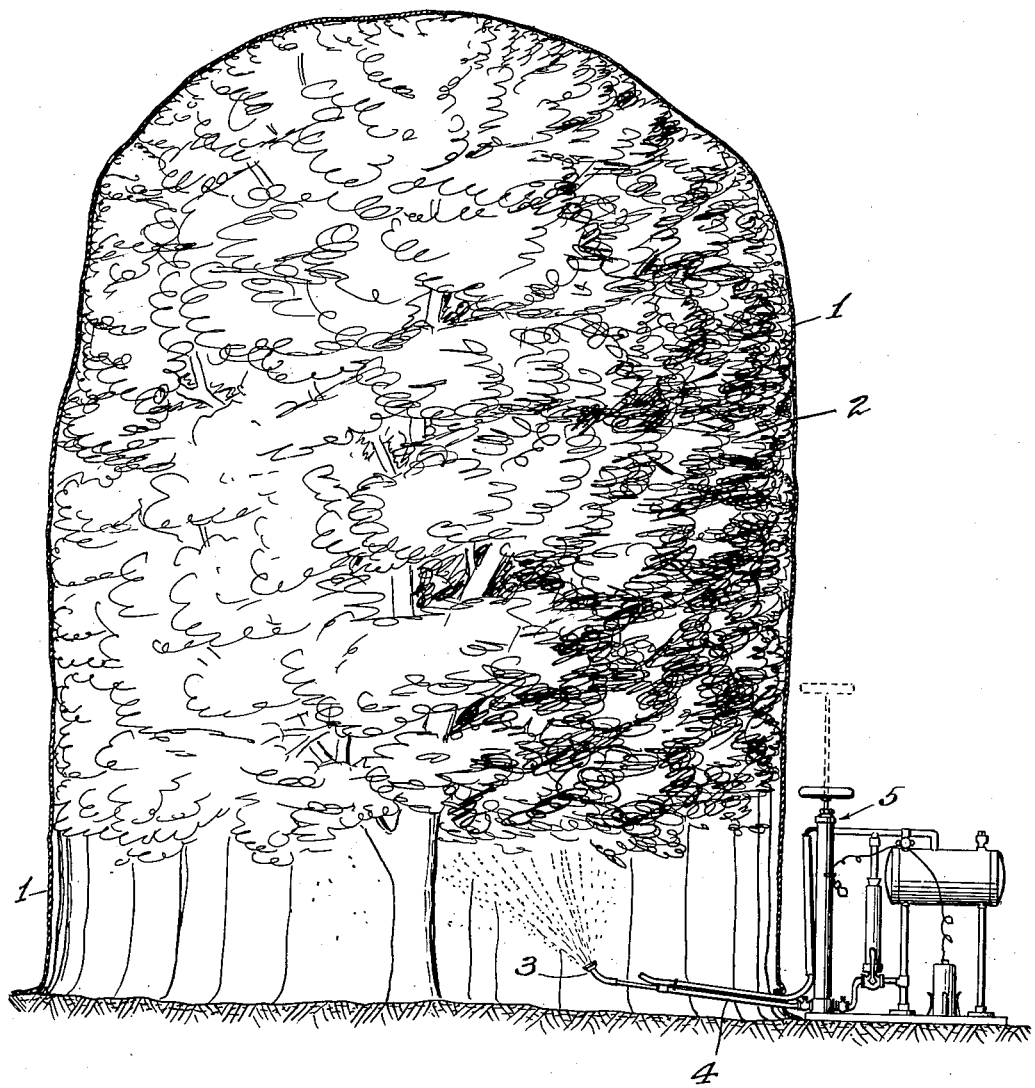
Witness
C. C. Holly.
Inventor
William G. Dingle
by James R. Townsend
his Atty.

UNITED STATES PATENT OFFICE.

WILLIAM G. DINGLE, OF LOS ANGELES, CALIFORNIA.

METHOD OF FUMIGATING.

1,304,747. Specification of Letters Patent. Patented May 27, 1919.

Application filed May 5, 1917. Serial No. 167,120.

*To all whom it may concern:*

Be it known that I, WILLIAM G. DINGLE, a citizen of the United States, residing at Los Angeles, in the county of Los Angeles and State of California, have discovered a new and useful Method of Fumigating, of which the following is a specification.

This discovery relates to the art of fumigating with hydrocyanic acid gas within an inclosure that is adapted to prevent the gas from escaping into the atmosphere.

An object of this invention is to provide for more perfect and more economical method of effecting the fumigation of citrus trees and the like.

It is well understood that fumigation with hydrocyanic acid gas may be conducted in the absence of actinic rays of light for the destruction of living organisms such as scale and other pests upon citrus and other trees, and various methods have been employed for effecting such fumigation. At one time this fumigation was effected by combining sulfuric acid and potassium cyanid under an inclosing tent in the absence of actinic rays of light, the process being conducted at night. In my Patent No. 1066001, dated July 1, 1913, I have shown a gas generator for fumigating apparatus whereby the mixing of the sulfuric acid and a cyanid solution is effected outside of the tent to produce a gas which is then introduced by means of hose into the space under the tent. In my co-pending application Serial No. 12936, filed the 8th day of March, 1915, I have shown means for combining a cyanid solution and an acid in measured quantities in a portable apparatus, adapted to be moved from tree to tree for the introduction beneath a tent of the produced gas through a hose.

I have discovered that in the methods known prior to my present discovery there is a definite loss through absorption of the gas into the water which passes with the gas into the inclosed space, and an object of this present discovery is to avoid such loss and also to reduce the liability of burning the trees or fruit.

Another object is to minimize the labor of fumigating orchard trees. In all of the former processes with which I am acquainted there has been considerable danger of injury to the operators, their clothing and the tents from contact with the chemicals. A further object of this present discovery is to eliminate this danger. With the former methods, and with this method, it is customary to conduct the work at a time when the actinic rays of light will not be present in the inclosed space, and therefore, as a matter of convenience, the fumigation is effected by night operation. The hydrocyanic acid is also highly inflammable and it is regarded dangerous to allow the use of open lights near the tents, and where such chemicals as sulfuric acid are required to be transported from tent to tent, and there dispensed, and such operation is necessarily done in the dark, there is very great danger that in handling the acid, injuries may result to the person and clothing of the operator and to the tent. Heretofore such injuries have been very frequent.

I have discovered that the fumigation can be most nearly effected by introducing liquid hydrocyanic acid into the desired inclosed space within which the fumigation is to be effected in such a manner as to allow the liquid to gasify within such space, and that this can be effected without injury to the trees by spraying the liquid hydrocyanic acid into such space while the temperature of the confined air is sufficient to cause gasification of the liquid.

This discovery is an improvement in the art over all the methods of conducting the process of fumigation heretofore known, and is broadly new, primary, pioneer and basic with relation to the way, the manner and the means in and by which the fumigation is conducted. The effect desired in the fumigation of citrus trees and other plants is the destruction of the pest without injury to the tree or plant, and the broad and sweeping improvement which I have made in the art is effected by the application of the discovery or principle in natural philosophy that the fumigations heretofore intended to be effected by means of hydrocyanic acid gas, have been subject to irregularities and uncertainties that are inherent in the processes heretofore employed and that the best method heretofore in use subjects the tree or plant to the action of substances foreign to the required agent, and that are detrimental and obstructive to the desired end; and that variations in results are likely to occur by reason of the varying quantities and strengths of the solid cyanogen compounds, heretofore used, simply because the same have been used directly. Such variations in purity of the solid alkali may occur between different lumps of the same batch of chemicals so that the fumigator operating by exact rule and prescription for each tree may have widely different results and may badly burn the tree without destroying pests thus reversing results as indicated by the prescription.

I have discovered that all these difficulties can be remedied by using liquid hydrocyanic acid sprayed or atomized within the inclosure when the temperature within the inclosure is such that the liquid hydrocyanic-acid thus sprayed or atomized will expand into a gas, and I have applied this discovery so that when the expansion is thus effected, the gas effectively and quickly permeates the space within the inclosure to the destruction of all animal life.

It is thus seen that the means which I use in this new method of fumigation includes as one of its elements the substance known as liquid hydrocyanic acid and the new manner of conducting the fumigation consists in causing the expansion of this substance into a gas within the inclosure for the purpose of destroying the pests; and I have effected this by spraying or atomizing the liquid hydrocyanic-acid by means of a nozzle within the inclosure so that the spraying apparatus containing such liquid is all that the operator has to handle, and such apparatus is very simple, and such handling is effected by a very simple operation of the apparatus which apparatus is easily portable and operable by hand.

By this newly discovered idea of means for effecting the fumigation, a single inexperienced operator with suitable light, easily operated apparatus is enabled to apply to each inclosure such an amount of the pest exterminator as may be called for by directions previously prepared and given to him. All that is necessary upon the part of the suitably equipped operator is simply to go from tree to tree after the same have been tent inclosed, and at each tree, to insert the spraying nozzle beneath the tent and then to operate the pump one stroke more or less according to the previous directions. The operator may thus pass rapidly from tent to tent and the fumigating operation is quickly completed and leaves no residue to be subsequently cared for.

The temperature conditions which are commonly prevalent where fumigation of the trees or plants is performed is effective for such gasification. That is to say, such temperatures are above 32° Fahrenheit. The rule which governs the fumigation of citrus trees in California requires that they shall not be fumigated at temperatures below 30° F., nor at temperature higher than 80° F., and I have determined that the gasification of liquid hydrocyanic acid is effective within this range, toward the complete eradication of living pests infesting the trees.

I apprehend that where there is moisture within the inclosed space, the same has an affinity for the gas and in time will become impregnated with such gas, and the leaves and fruit upon which such moisture rests will be burnt by the gas-impregnated water. I have discovered that by eliminating the introduction of water from the hydrocyanic acid which is introduced into the inclosed space, the liability of burning is diminished. Furthermore, the effectiveness of the chemicals is increased for the reason that the hydrocyanic acid gas is free to act and is not absorbed by the water found present in other fumigating methods.

I have practically determined that a saving of about 25% of the chemicals used per tree can be effected by my new method.

For the purpose of effectively, conveniently and safely carrying out this method I have discovered and invented a certain method and means for producing liquid hydrocyanic acid, and have also invented a new and useful apparatus for spraying this acid for the purpose of fumigating, as set forth in my co-pending applications for patent, Serial No. 167,118, filed on the 5th day of May, 1917, and Serial No. 167,119 filed on the 5th day of May, 1917.

The following is a description of my newly discovered method, reference being had to the accompanying drawing in which 1 indicates a tent or cover in vertical section applied to a tree 2 to be fumigated and 3 represents a spraying nozzle introduced into the space under the tent by means of a pipe 4 connected to any suitable means such as the pump 5 described in my said application Serial No. 167,119 for delivering to the spraying nozzle the liquid hydrocyanic acid.

In practice the tree 2 will be covered by the tent 1 in the usual way and the operator will insert the nozzle underneath the tent and will force the hydrocyanic acid through the pipe by the pump 5 and cause the same to be sprayed by the nozzle 3 within the inclosed space under the tent and will maintain the tent in position with the internal temperatures at a requisite heat for a period of about 45 minutes, more or less. I have performed the work satisfactorily by maintaining the inclosed space about the tree free from atmospheric communication for a period of 30 minutes and at a temperature of from 40° Fahrenheit to 75° Fahrenheit and I have also maintained the tent over the tree under about such conditions for a period of 60 minutes.

I deem the shorter period preferable for reasons of economy of time as the fumigating effect seems to be well completed within that period under suitable temperature.

By practical experience I have determined that it is better to return the tree to the atmosphere as soon as possible after the fumigation has been effected. The effect of over fumigation upon a tree is manifested by wilting of the leaves, and I find that the tree shows less of such effect and recovers more rapidly therefrom if the fumigation is continued for a minimum period only sufficient to destroy the pests.

The action of the hydrocyanic acid gas produced by this new method, that is to say, by means of liquid hydrocyanic acid introduced into the inclosed space and caused or allowed to expand, appears to be rapid at the higher temperatures and I apprehend that the higher the temperature the shorter the period of fumigation may be and that by my method fumigation may be safely conducted at temperatures greater than heretofore deemed advisable provided the period is appropriately shortened.

By my present improvements herein referred to I am enabled to apply pure hydrocyanic acid gas to the work, and I apprehend that in former processes a cause for failure to destroy the pests and also a cause for the destructive action upon fruit and foliage of the tree arose from stratification of gaseous impurities as well as from the absorption of the gas in the moisture present or accumulating upon fruit and foliage during the process of fumigation, and I apprehend that with proper attention to atmospheric and wind conditions, it may be found that it is possible by my present improvement to successfully fumigate citrus trees and the like during the day time, the tree being covered by the tent only for such period as may be found requisite. The higher temperatures of the day time serve to maintain the gas and also serve to facilitate the production of the gas from the liquid hydro-cyanic acid, well maintaining the destructive agent in its gaseous form.

It is thus seen that in this new method I cause the air surrounding or containing the pests, to be practically charged or permeated with pure hydrocyanic-acid gas free from impurities, and that this means or method of applying hydrocyanic-acid gas to the tree is conducive of maintaining the impregnated air in pest destroying condition for a requisite period until the life of the pest is extinct.

Particular attention is directed to the fact that in this method I insure the production within the tent or other envelop about the tree, of a dry gas, that is to say, a gas entirely devoid of free sulfuric acid and also free from water, and that the fumigator is not burdened with the disposal of any sludge or residue such as has heretofore been a sure accompaniment to fumigating processes heretofore employed in destroying scale on citrus trees.

Furthermore, particular attention is directed to the elimination of all necessity of using in the field any apparatus difficult of transportation; such as the pot required for each tent by the method which was introduced about thirty years ago and has been employed since then until very recently, and also to the avoidance of the necessity of using machines that have to be drawn by horse-power or other power greater than man power; and also by this discovery I have avoided the necessity of transporting through the orchard the chemicals that it was necessary to take into the field under the more recent methods in use prior to this invention.

A further advantage in the fumigation of trees, which is attained by the novel method herein disclosed, arises from the fact that scale pests infesting citrus trees are more abundant and more sturdy at the lower parts of the tree, and decrease in numbers and in age toward the upper parts of the tree, and the tree likewise is more sturdy and immune to the effects of the gas at the lower parts of the tree, and is more subject to injury by the gas acting upon the tender new growth at the upper parts of the tree, and when newly generated gas is introduced into the inclosure, as in both the former methods, namely, the "pot" method, and the "machine" method, the gas when introduced is at a temperature that is higher than the air contained within the inclosure, so that said gas rapidly rises to the upper parts of the inclosure and is more effective where the tree is least resistant, and where the pests are fewest. On the contrary, with this new method, the gas arising from the necessarily cold liquid, in which form it is introduced, ascends more slowly and operates more effectively upon the lower parts of the tree where the pests are most resistant, and the effect upon the upper parts of the tree is practically innocuous, so far as the tree is concerned, and the destruction of the pests throughout the inclosure is effected more perfectly and danger of injury to the tree is avoided to such an extent that I have found it practical to fumigate citrus trees with hydrocyanic acid gas by this new method with the ordinary fumigating tent in bright daylight, which was impractical with all former methods.

Further, by the use of the pure hydrocyanic acid in the form of a liquid, as above disclosed, the fumigation of buildings, ships, and the like is rendered possible without injury to any of the inorganic contents therein.

That is to say, it has been heretofore proposed to utilize hydrocyanic acid gas for fumigation purposes in ships, buildings, and the like, by introducing the said gas into the chamber it is desired to fumigate immediately after its production, in which state it always contains more or less impurities, such as sulfureted hydrogen, etc. These impurities have been found to have a very detrimental effect upon certain metals such as silver, gold, brass, copper, nickel, etc., and also upon fabrics, such as cotton, silk, linen, and the like.

I have found, however, that by introducing the hydrocyanic acid in the liquid form, it is possible to eliminate substantially all of the said impurities, and to produce hydrocyanic acid gas which has a purity of approximately 96 to 98%. In the fumigation of ships, rooms, houses, etc., by the use of liquid hydrocyanic acid, which is converted into hydrocyanic acid gas, containing not more than 2 to 4% impurities, it is possible to introduce the said acid into rooms containing the above mentioned metals, and fabrics, for fumigation purposes, without tarnishing the metals or in any other way injuring the said metals and fabrics.

I claim:

1. The method of fumigating which consists in spraying into an inclosed space containing objects to be fumigated, liquid hydrocyanic acid while the contained air inside the space is at a temperature suitable for gasification of said liquid and allowing the liquid to gasify in said space and to permeate the atmosphere therein with hydrocyanic acid gas formed by said gasification.

2. The method set forth of fumigating trees and plants which consists in subjecting the tree or plant within a confined space to the action of gas produced by the expansion of liquid hydrocyanic acid into gas within such space.

3. The step in the method of fumigating orchards set forth which consists in spraying liquid hydrocyanic acid into the space inclosed over the tree for the purpose of allowing the liquid hydrocyanic acid to expand into a gas to envelop the tree and destroy insect life.

4. The method of fumigating trees in orchards which comprises placing a tent over a tree, setting a suitable apparatus outside of the tent with a spray nozzle extending into the tent, loading the apparatus with hydrocyanic acid and operating the apparatus to discharge the acid through the spray nozzle, and allowing the tent to remain over the tree to prevent escape of gas until the sprayed hydrocyanic acid has gasified and permeated the air under the tent.

5. The method of destroying organisms set forth which consists in confining the organisms with air in an inclosed space at a temperature at which liquid hydrocyanic acid will expand to form a gas, then causing liquid hydrocyanic acid to expand within and to charge such air, and maintaining the charged air within said inclosed space and about the organisms for a requisite period of time until the life of the organisms is extinct.

6. The method set forth of destroying organisms which consists in injecting into a body of air containing such organisms a charge of liquid hydrocyanic acid while the air is under such conditions as to allow the liquid hydrocyanic acid to expand into gas and to charge such air with such gas; and maintaining the gas impregnated air about the organisms for a period of time until the life of the organisms is extinct.

7. The method of fumigating to destroy living organisms which consists in charging liquid hydrocyanic acid in such condition, and into air which is at a temperature that will cause the liquid to expand into a gas and thereby impregnating the air with hydrocyanic acid gas and then maintaining such air about the organisms until the life thereof is extinct.

8. In the fumigation of citrus trees the method set forth of inclosing the tree for a period of approximately thirty minutes in an atmosphere impregnated with hydrocyanic acid gas which is produced by introducing hydrocyanic acid in a liquid form within the inclosed space, and subjecting said liquid hydrocyanic acid and the atmosphere within the inclosure to a temperature at which liquid hydrocyanic acid will expand into a gas.

In testimony whereof, I have hereunto set my hand at Los Angeles, California, this 27th day of April, 1917.

WILLIAM G. DINGLE.

Witness:
  JAMES R. TOWNSEND.